(12) United States Patent
Cremin et al.

(10) Patent No.: US 6,504,843 B1
(45) Date of Patent: Jan. 7, 2003

(54) SYSTEM AND METHOD FOR DYNAMICALLY MAPPING A HIGH SPEED LINK TO A MULTIPLICITY OF LOW SPEED TRUNKED LINKS

(75) Inventors: Con Cremin, Dublin (IE); Sorcha O'Callaghan, Dublin (IE); David Nolan, CeleBridge (IE); Raymond Beechinor, Dublin (IE); Richard A Gahan, Gory (IE)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/353,606

(22) Filed: Jul. 14, 1999

(30) Foreign Application Priority Data

Feb. 24, 1999 (GB) .............................. 9904068

(51) Int. Cl.[7] ......................... H04L 12/28; H04L 12/56
(52) U.S. Cl. ................... 370/389; 370/392; 370/395.32
(58) Field of Search ................................ 370/412, 401, 370/392, 389, 393, 395.32, 395.31

(56) References Cited

U.S. PATENT DOCUMENTS

| 6,044,080 A | * | 3/2000 | Antonov ..................... 370/235 |
| 6,084,877 A | * | 7/2000 | Egbert et al. ................ 370/389 |
| 6,111,877 A | * | 8/2000 | Wilford et al. ............. 370/238 |
| 6,181,702 B1 | * | 1/2001 | Egbert ........................ 370/389 |

FOREIGN PATENT DOCUMENTS

| EP | 0804005 A2 | 10/1997 |
| WO | WO 98/23127 | 5/1998 |

* cited by examiner

*Primary Examiner*—David Vincent
*Assistant Examiner*—Nittaya Juntima
(74) *Attorney, Agent, or Firm*—Nixon & Vanderhye P.C.

(57) ABSTRACT

A method for distributing addressed data packets from an input channel to a multiplicity of packet queues includes receiving said addressed data packets and, responsive to first hashed addresses, distributing the addressed data packets to said queues in accordance with said first hashed addresses. A first hash function is applied to selected address data of each of said addressed data packets to produce said first hashed addresses. At the same time a succession of different hash functions is applied to said selected address data in each of the packets to produce second hashed addresses and occurrences of each of the second hashed addresses are counted so as to obtain for each of said different hash functions a respective one of a plurality of set of counts, each such set representing the distribution of said packets that would occur in said queues if the respective one of the different hash functions had been applied to said addressed data packets. The sets of counts are analyzed to determined which one of them represents a best distribution of said packets and the hash function associated with the best distribution is applied to incoming packets in place of the said first hash function.

5 Claims, 2 Drawing Sheets

SYSTEM AND METHOD FOR DYNAMICALLY MAPPING A HIGH SPEED LINK TO A MULTIPLICITY OF LOW SPEED TRUNKED LINKS

FIELD OF THE INVENTION

The present invention relates to packet-switched data communication networks and particularly to a network switch which includes a facility for demultiplexing data received in the form of packets over a high speed serial link to a multiplicity of channels or ports which are intended or constructed to operate at an individually lower frequency than the high speed link.

BACKGROUND TO THE INVENTION

It is known, in respect of a multi-port network switch which is adapted or intended for operation at a particular data rate, or possibly a plurality of data rates such as ten and one hundred megabits per second, to dedicate a multiplicity of ports for the reception of data at a much higher data rate, such as one gigabit per second, and to direct packets to the dedicated multiplicity of ports by means of a demultiplexer which is controlled by a comparatively short address word obtained by hashing a longer address or combination of addresses in each data packet. The operation of hashing, whatever particular hashing function is used, reduces the comparatively wide address data to a comparatively short address, such as a two-bit word if the demultiplexer is to control only four channels or ports, and it is characteristic of hashing functions that the same input address data (or combination of addresses) will always map to the same short hashed address.

Controlling a demultiplexer in this manner is more appropriate than, for example, allotting successive packets to the different ports in a round robin manner, because the latter does not guarantee that packets having the same address or source address and destination address combination will be handled in the same chronological order as they have been transmitted over the high speed link. In particular, it is common for ports to contain respective FIFO stores or other means of temporarily holding received data packets in respective queues The onward forwarding of data packets in those queues depends on, for example, available bandwidth in devices connected to the respective ports of the switch, the outcome of contention resolution between high and low priority packets and so forth. It is desirable to ensure that packets having corresponding address data, and more particularly having the same source address and destination address combination, are directed to the same receive queue in the same order in which they have been received.

The disadvantage of known schemes for controlling demultiplexing by hashing address data on incoming packets is that non-uniform distribution of traffic may result in a more strongly non-uniform allocation of packets to particular ports, which might initiate flow control or bandwidth limitation measures but is in any event undesirable in a scheme which is intended to distribute data from a high speed link to a multiplicity of lower speed links; the combined throughput of the lower speed links will normally always be a maximum if the links or ports carry equal shares of the incoming traffic.

The basis of the present invention is a combination of various features. There must be available a multiplicity of hash functions, which may be stored in memory or represent different configurations of a logic array. These hash functions may be selectively applied to demultiplex incoming packets so that packets having the same relevant address data (as explained below) are for a given hash function directed to the same queue in correct chronological order. Further, there is a monitoring means which applies to the packets received by the group of ports, or at least to the selected address data, a multiplicity of hash functions so as to obtain a statistical analysis of the effect of applying a variety of hash functions to the selected address data of the incoming packet traffic. The monitoring process is performed while the actual demultiplexing of the incoming traffic continues in accordance with a selected or default hash function, The scheme enables the selection of a hash function by a statistical analysis of the data obtained by the monitoring process and therefore the selection of that hash function which having regard to the flow of traffic will most nearly equalize the distribution of packets to the multiplicity of dedicated ports.

Further features of the invention will be apparent from the following description with reference to the drawings.

DETAILED DESCRIPTION

The present invention will for convenience be described in the context of a switch which has a multiplicity of ports for receiving packets from a corresponding variety of sources and which provides packets in time shared fashion to a Dbus, typically a 64-bit wide bus operating at 33 Megahertz. In an example of this context, an access controller for the bus allows packets in to defined time slots and normally allows, for n ports, 1/n of the available bandwidth to each port. In the particular example to be described, the switch has thirty-two ports of which a selected minority, typically but not necessarily four, of the ports are trunked ports which are dedicated to the downlink and receive data from a single, higher speed link. In practice, the invention can be embodied as a plug-in card which couples to a multiplicity of ports on a network device such as a multi-port switch.

Nevertheless, this context for the present invention is only given by way of example. The common features of contexts in which the invention has utility are a high speed link from which packets need to be evenly distributed to a multiplicity of packet queues while ensuring that packets which have the same selected address data, such as the same source address or the same source address and destination address combination, always go to the same traffic queue and that the temporal ordering of packets having a given address, according to the relevant selection criterion, is required to be preserved in the respective traffic queue.

As remarked previously, it is simple to ensure, ignoring the foregoing requirement, that packets received over a single high speed link are distributed evenly to a multiplicity of traffic queues. A round robin distribution scheme be sufficient. However, a round robin scheme cannot guarantee the temporal ordering of packets having the same selected address data and it is inevitable to find, if one ensures that the packets with the same selected address data go to the same queue, that there will be in practice serious imbalance in the lengths of the queues. The effect is acerbated in the particular context mentioned, because each traffic queue will be allotted the same bandwidth on the Dbus.

In some circumstances, a hashing function which is operative only on source addresses (SA) of packets may be used for demultiplexing the packets from the high speed link. However, if the source of packets is a file server, all the source addresses will hash to the same number and all the packets will be sent to the same queue. For that reason it is in general desirable to have a menu of hashing functions, some of which at least rely on a source address/destination address combination or at least data not confined to a source address or part of it.

Figure 1:
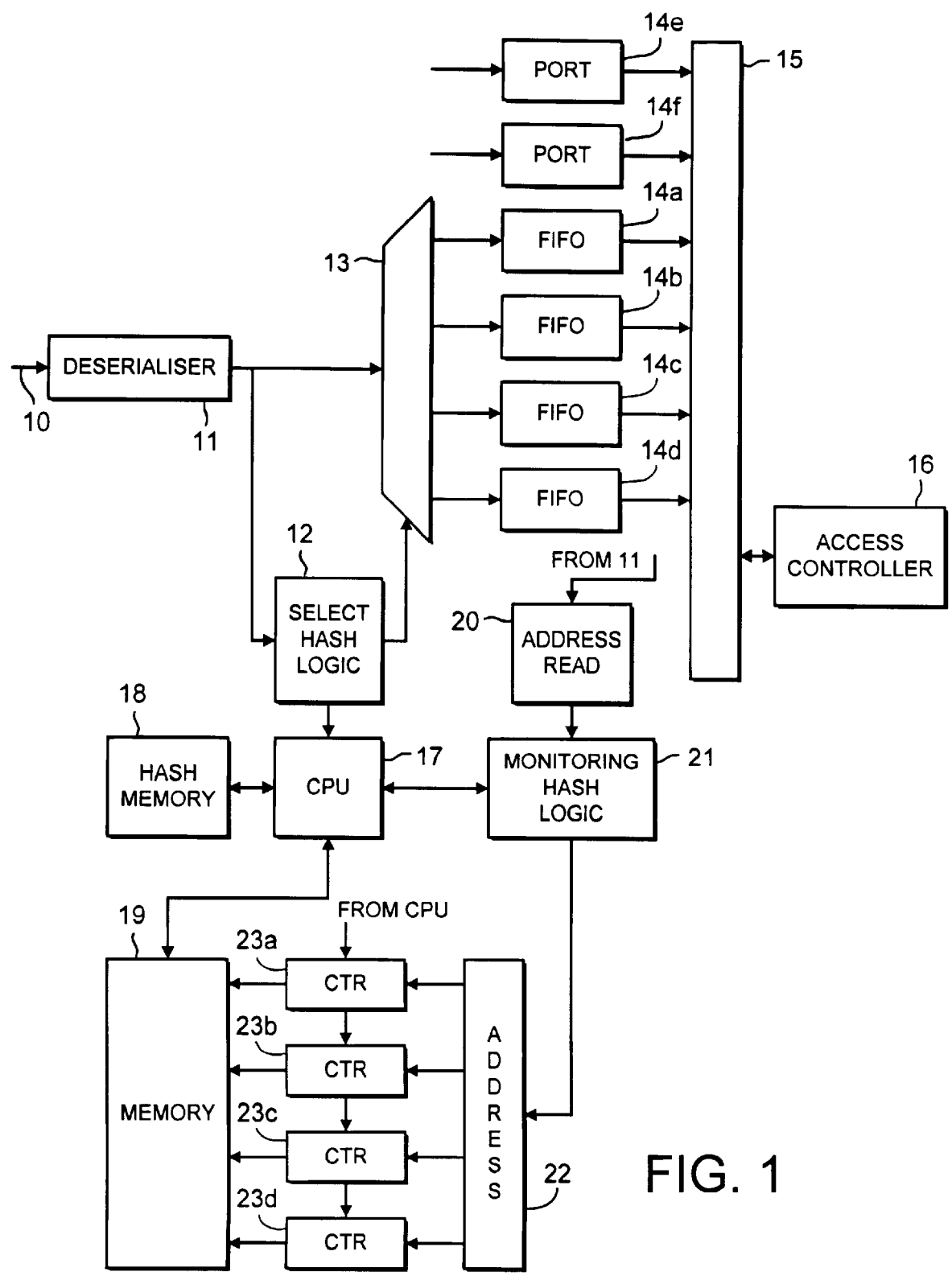
FIG. 1 is a schematic diagram of part of an Ethernet switch including a downlink in accordance with the invention.

FIG. 1 shows schematically the relevant part of a downlink which incorporates the invention. As will be apparent, part of the downlink (and particularly parts 11 to 17) is organised in accordance with known practice, the invention includes a monitoring scheme which enables an improvement in the packet distribution that can be achieved by the dedicated ports.

In FIG. 1, the reference 10 illustrates a very high speed serial data link, typically operating at a rate well in excess of 1 Gigabit per second. The serial data is deserialised by a deserialiser 11, which provides packet data, typically in blocks of parallel data, to a demultiplexer 13 which is controlled by select hash logic 12 to direct packets to any one of a dedicated multiplicity of ports, which in this example are represented by FIFOs 14a to 14d. This is not the only arrangement that could be devised, and in particular the deserialiser may be applied to outputs that are in effect plugged into standard ports of a multi-port switch.

The FIFOs may be constituted by a fixed space allotted to each FIFO in a static RAM, pointers defining the head (write) end and tail (read) end of each FIFO. The architecture is not essential, provided that the ports can each form a queue of packets in the order in which that port receives the packets. For example, the packets may be directed by way of a bus to a buffer memory and queues of packets may then essentially be defined by a queue or queues of pointers, each of the pointers defining an address for a respective buffer in the buffer memory. These modifications will be obvious to those skilled in the art; for the purpose of the present invention it is only necessary that for each relevant port or channel there is defined a respective queue of packets.

Other ports for the downlink, not connected to the high speed link 10, are shown as the ports 14e to 14f. In a typical example the downlink may have twenty-four ports of which four are constituted by the ports 14a to 14d and the other twenty are merely represented in this example by the ports 14e and 14f.

As briefly indicated previously, the FIFOs 14a to 14d and the relevant FIFOs (not shown) for the other ports 14e and 14f can provide packets to a Dbus 15, which in this example is a 64-bit wide data bus operating at 33 Megahertz. An access controller 16 for the bus may define, in this example, twenty-four time slots which are evenly allocated to the packet queues, whereby if any queue has a packet to send the access controller allocates that packet to the respective time slot. In this scheme, any of the n ports is accorded 1/n of the bandwidth available on the bus 15.

The select hash logic 12 applies to selected address data of each packet a hashing function which reduces that selected data to a short address word that controls the demultiplexer 13. In the particular example, the hash result is a 2-bit word that defines four possible outputs or channels from the demultiplexer. Each of the four possibilities for the address word is associated with one of the 'ports' 14a to 14d.

A typical hash function, performing for example an exclusive-or operation on alternate bits on a source address, will hash the selected address data always to the same 2-bit word so that packets coming in over the high speed link 10 will always be directed to the same one of the FIFOs 14a to 14d. A simple hashing scheme of this nature will avoid the loss of temporal ordering of a round robin scheme but owing to the comparatively small number of addresses to which the selected address data can be reduced by hashing, a hashing scheme is liable in general to produce an imbalance in the lengths of the packet queues in the trunked ports.

Figure 2:
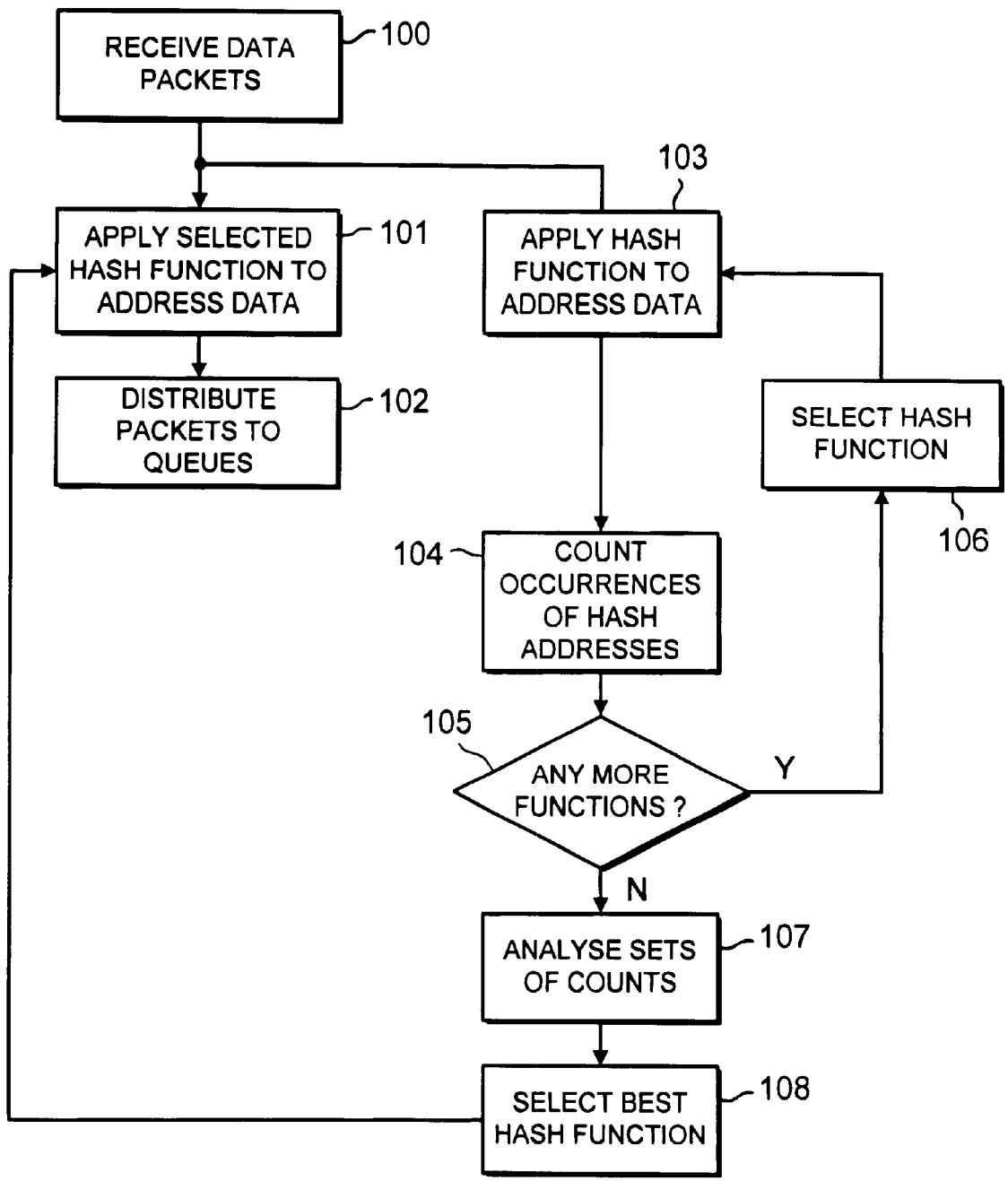
FIG. 2 is a flow diagram of a method according to the invention.

The actions of receiving packets, applying a selected hash function and distributing packets to queues are summarized in stages 100 to 102 of FIG. 2.

One provision on which the invention relies is a menu or variety of hash functions which can be selected for use by the select hash logic 12. The number and particular nature of the hash functions are not important provided that there are at least some which will hash a given source address or source address/destination address combination to a different respective one of the packet queues. In practice, there may be four selectable hash functions which may be selected for use either on the source address or on the source address/destination address combination of the packets. In effect this gives eight different hash functions. These may be stored in a hash memory 18 associated with a CPU 17 and be selected for application to the hash logic 12 by the CPU. Alternatively they may be stored in external memory 19 associated with the microprocessor (CPU) 17.

Before the remainder of the particular downlink is described and in particular before there is discussion of the monitoring process of the present invention, it may be remarked that on start-up it would be normal for the CPU 17 to select some default hash function for application to the select hash logic 12 and for the packets incoming on link 10 to be distributed to the queues in FIFOs 14a to 14d in accordance with that default function until a statistic analysis as described hereinafter has been completed.

The present invention includes a function, shown as address read 20, which will read the address data of all the packets which are received by the FIFOs 14a to 14d, that is to say all the packets which have been received over the high speed link 10. The precise point at which the address data of the packets are read is not important, they may for example be read on transmission from the FIFOs to the bus 15. As shown they are read from the packets' output by the deserialiser 11. All that is required is that there be available to monitoring hash logic 21 the same address data that is available to select hash logic 12.

The monitoring hash logic 21 can perform on the available address data of the packets received by FIFOs 14a to 14d any of the hashing functions which the select hash logic 12 can perform on the packets before those packets are demultiplexed to the FIFOs 14a to 14d. The purpose of the monitoring hash logic 21 is to develop for a given source address or source address/destination address combination the same hashed address word as is obtained from select hash logic 12 so that an addresser 22 can perform the same distribution responsive to the hashed address word as the demultiplexer 13. However, in response to each hashed address, addresser 22 merely provides an incrementing signal to the respective counter 23a to 23d. These counters 23a to 23d can be reset by the CPU 17 and on command from the CPU can provide the respective accumulative count for storage in the memory 19. It is therefore the monitoring hash logic 21 is programmed with the same hashing function as the select hash logic 12, the distribution of incrementing pulses to the counters 23a to 23d will correspond to the distribution of packets to the FIFOs 14a to 14d.

The purpose of the monitoring scheme is, while the distribution of packets to the FIFOs 14a to 14d proceeds, to gauge the effect of different hashing functions on the same traffic. Thus, in some selectable monitoring period (which may be a few seconds), a count of the packets distributed to the FIFOs 14a to 14d is accumulated in the respective counters 23a to 23d.

Accordingly, while the actual distribution of the packets in accordance with the hash functions selected and applied to select hash logic 12 proceeds, the microprocessor 17 applies trial hash functions in turn to the monitoring hash logic 21, during successive and selectable periods. Therefore at the end of a cycle of operation there will be a plurality, typically eight, of sets of counts (typically four in a set) which represent the distribution of packets to the FIFOs 14a to 14d that would have occurred if the respective hashing functions had actually been in use on the traffic received. The operation is summarized in stages 103 to 106 of FIG. 2.

Such results are susceptible of automated analysis (stage 107) under programmed control because it is necessary only to determine which set provides the most even distribution of packets. This can readily be achieved by computing the mean of the four counts in a set and then computing the 'best' hash function (stage 108) in accordance with any suitable criterion, such as the least sum of the squares of the deviation of the counts from the computed mean, However some other criterion, such as the set which has the least maximum deviation from the computed mean could be used if desired.

It is furthermore a straightforward matter to program the CPU to substitute, for the default hashing function in select hash logic 12, the hash function which gives the best distribution of packets to the FIFOs 14a to 14d in accordance with the statistical analysis obtained by the monitoring process.

The invention relies in the existing embodiment on a multiplicity of predetermined hash functions. A possible modification is to achieve the multiplicity of hash functions by successive modification of a basic hash function and the term 'multiplicity of hash functions' is intended to relate to the use of a single basic hash function which may be successively or progressively modified to provide different hash results.

What is claimed is:

1. A device for distributing addressed data packets from an input channel to a multiplicity of packet queues, comprising:
   (i) distributing means comprising:
      (a) means for defining said packet queues;
      (b) a demultiplexer for receiving said addressed data packets and responsive to first hashed addresses to distribute the addressed data packets to said queues in accordance with said first hashed addresses;
      (c) means for providing a first hash function; and
      (d) first means for applying said first hash function to selected address data of each of said addressed data packets to produce said first hashed addresses; and
   (ii) monitoring means comprising:
      (e) means for providing a succession of different hash functions;
      (f) second means for applying a hash function in the succession thereof to said selected address data in each of the packets to produce second hashed addresses; and
      (g) means for counting occurrences of each of the second hashed addresses so as to obtain for each of said different hash functions a respective set of counts representing the distribution of said packets that would occur in said queues if the respective one of the said different hash functions had been applied to said demultiplexer.

2. A device according to claim 1 wherein said means for defining said packet queues are a plurality of FIFO buffers.

3. A device according to claim 2 and further comprising a time-slotted data bus coupled to receive packets from said FIFO buffers.

4. A method for distributing addressed data packets from an input channel to a multiplicity to of packet queues, comprising the steps of:
   (a) defining said packet queues;
   (b) receiving said addressed data packets and, responsive to first hashed addresses, distributing the addressed data packets to said queues in accordance with said first hashed addresses;
   (c) providing a first hash functions;
   (d) applying said hash function to selected address data of each of said addressed data packets to produce said first hashed addresses; and
   while performing steps (a)–(d)
   (e) providing a succession of different hash function;
   (f) applying a hash function in the succession thereof to said selected address data in each of the packets to produce second hashed addresses; and
   (g) counting occurrences of each of the second hashed addresses so as to obtain for each of said different hash functions a respective one of a plurality of set of counts, each such set representing the distribution of said packets that would occur in said queues if the respective one of the different hash functions had been applied to said addressed data packets.

5. A method according to claim 4 and further comprising:
   (h) computing from said sets of counts and a selected criterion which one of the said different sets of counts represents a best distribution of said packets; and
   (i) applying the hash function associated with said one of the different sets of counts in place of the said first hash function.

* * * * *